(12) United States Patent
Braggion et al.

(10) Patent No.: US 11,752,909 B2
(45) Date of Patent: Sep. 12, 2023

(54) SEAT ASSEMBLY TRIM PANEL

(71) Applicant: Lear Corporation, Southfield, MI (US)

(72) Inventors: Angela Braggion, Grugliasco (IT); Luca Possetto, Grugliasco (IT)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 17/550,057

(22) Filed: Dec. 14, 2021

(65) Prior Publication Data
US 2023/0182629 A1   Jun. 15, 2023

(51) Int. Cl.
| | | |
|---|---|---|
| *A47C 7/02* | (2006.01) | |
| *B60N 2/58* | (2006.01) | |
| *B60N 2/64* | (2006.01) | |
| *B60N 2/72* | (2006.01) | |
| *B60N 2/70* | (2006.01) | |

(52) U.S. Cl.
CPC ......... *B60N 2/5883* (2013.01); *B60N 2/5891* (2013.01); *B60N 2/7017* (2013.01); *B60N 2/72* (2013.01)

(58) Field of Classification Search
CPC .. B60N 2/5891; B60N 2/7017; B60N 2/5883; B60N 2/6009; B60N 2/58; B60N 2/5875; B60N 2/70; B60R 13/02
See application file for complete search history.

(56) References Cited

U.S. PATENT DOCUMENTS

| | | | | |
|---|---|---|---|---|
| 530,595 | A * | 12/1894 | Kobelt | D05B 73/12 112/439 |
| 1,869,386 | A * | 8/1932 | Marzak | D05C 17/00 112/439 |
| 2,330,459 | A * | 9/1943 | Tweedie | A43C 11/006 112/439 |
| 3,040,332 | A * | 6/1962 | Kleinwald | D05C 17/00 112/439 |
| 4,313,776 | A * | 2/1982 | Urai | B29C 66/8322 156/289 |
| 4,534,595 | A * | 8/1985 | Abe | B60N 2/5875 297/452.61 |
| 4,627,664 | A * | 12/1986 | Okazaki | B29D 99/0092 297/452.61 |
| 4,740,035 | A * | 4/1988 | Kazaoka | B60N 2/66 297/218.1 |
| 4,995,926 | A * | 2/1991 | Urai | A47C 7/18 156/289 |
| 5,089,191 | A * | 2/1992 | Hughes | B60N 2/5891 264/46.7 |
| 5,395,473 | A * | 3/1995 | Nixon | B29C 66/1122 156/291 |
| 7,851,039 | B2 * | 12/2010 | Boinais | B32B 5/18 428/102 |
| 8,071,002 | B2 * | 12/2011 | Boyer | B29C 45/14811 264/279 |
| 8,530,028 | B2 * | 9/2013 | Smith | B60R 13/02 428/102 |

(Continued)

*Primary Examiner* — Shin H Kim
(74) *Attorney, Agent, or Firm* — Brooks Kushman P.C.

(57) ABSTRACT

A trim panel is provided with a first leather portion laminated with a stabilization material, wherein the first portion has a thickness. The trim panel is provided with a second leather portion adjacent to the first leather portion without a laminated stabilization material. The second portion has thickness that is equal to the thickness of the first portion.

20 Claims, 3 Drawing Sheets

(56) References Cited

U.S. PATENT DOCUMENTS

| | | |
|---|---|---|
| 10,118,525 B2 | 11/2018 | Kromm et al. |
| 10,414,305 B2* | 9/2019 | Ishii .................. B60N 2/64 |
| 10,736,435 B2 | 8/2020 | Duncan et al. |
| 11,247,593 B2* | 2/2022 | Townley ............. B60N 2/7017 |
| 11,325,290 B2* | 5/2022 | Stroebe ................ B29C 43/203 |
| 11,622,537 B2* | 4/2023 | Frishman ............... B32B 27/32 |
| | | 54/79.4 |
| 2002/0096931 A1* | 7/2002 | White .................. B60N 2/5657 |
| | | 297/452.42 |
| 2004/0019950 A1* | 2/2004 | Rast .................. A41D 13/0587 |
| | | 2/77 |
| 2005/0238842 A1* | 10/2005 | Schindzielorz .......... B60N 2/70 |
| | | 428/102 |
| 2007/0210484 A1* | 9/2007 | Fantin .............. B29C 45/14811 |
| | | 264/296 |
| 2008/0157432 A1* | 7/2008 | Boyer .............. B29C 45/14811 |
| | | 264/259 |
| 2010/0171333 A1* | 7/2010 | Smith .............. B29C 45/14811 |
| | | 156/93 |
| 2010/0255227 A1* | 10/2010 | Hisle ..................... B44C 5/043 |
| | | 428/34.1 |
| 2011/0109111 A1* | 5/2011 | Petouhoff ................ D06Q 1/00 |
| | | 296/1.08 |
| 2012/0175935 A1* | 7/2012 | Severinski ........... B60N 2/5891 |
| | | 297/452.38 |
| 2016/0096462 A1* | 4/2016 | Kromm ................ B60N 2/7017 |
| | | 297/452.38 |
| 2016/0339819 A1* | 11/2016 | Shindo ..................... B68G 7/05 |
| 2016/0368405 A1* | 12/2016 | Ishii .................... B60N 2/5866 |
| 2017/0136955 A1* | 5/2017 | Walk ......................... B62J 1/18 |
| 2018/0009354 A1* | 1/2018 | Shindo .................... B60N 2/305 |
| 2018/0162293 A1* | 6/2018 | Kusky ................... B32B 27/304 |
| 2018/0334064 A1* | 11/2018 | Marques ............. B60N 2/5891 |
| 2018/0334066 A1* | 11/2018 | Marques ............. B60N 2/7017 |
| 2019/0381917 A1* | 12/2019 | Kamata ................ B60N 2/5875 |
| 2020/0238658 A1 | 7/2020 | Cabouillet et al. |
| 2021/0031658 A1* | 2/2021 | Hering ................. B60N 2/5891 |
| 2021/0086670 A1 | 3/2021 | Kozlowski et al. |
| 2021/0245680 A1* | 8/2021 | Czerkas .................... B32B 3/08 |
| 2022/0134703 A1* | 5/2022 | Brandt ..................... D06Q 1/14 |
| | | 428/196 |
| 2022/0380953 A1* | 12/2022 | Brandt .................... D04H 1/498 |

* cited by examiner

SEAT ASSEMBLY TRIM PANEL

TECHNICAL FIELD

Various embodiments related to a leather trim panel for a seat assembly.

BACKGROUND

Existing leather trim panels in vehicle seat assemblies provide comfort and ornamentation to the vehicle seat.

SUMMARY

According to an embodiment a trim panel is provided with a first leather portion laminated with a stabilization material, where the first portion has a thickness. The trim panel is provided with a second leather portion adjacent to the first leather portion without a laminated stabilization material. The second portion has thickness that is equal to the thickness of the first portion.

According to a further embodiment, the second portion is smaller than the first portion.

According to a further embodiment, a foam layer is attached to a base of the first portion.

According to another further embodiment, the first portion is laminated with an adhesive layer adhered to the foam layer.

According to another further embodiment, the adhesive layer and the first portion of the trim panel collectively provide a thickness and three-dimensional appearance to the trim panel.

According to an even further embodiment, the adhesive layer is thermally laminated to the first portion and the foam layer.

According to another even further embodiment, a foam layer is provided to a base of the second portion.

According to yet another further embodiment, the second portion is attached to the foam layer of the second portion.

According to yet another even further embodiment, no adhesive is applied to the second portion of the trim cover. This allows the second portion to remain in equal thickness to the first portion and to provide a three-dimensional appearance.

According to yet another even further embodiment, the second portion is not bonded to the foam layer.

According to yet another even further embodiment, a silicon layer is provided to the second portion of the trim panel.

According to another further embodiment, cross stitching is provided along a contact surface of the second portion.

According to another further embodiment, the cross stitching of the second portion converges to a more concentrated pattern than the cross stitching of the first portion.

According to another even further embodiment, a seam is provided along a perimeter of the first portion and the second portion.

According to another even further embodiment, a foam layer is provided to a base of the second portion. The second portion has a thickness with a peak thickness within an area within the cross stitching in the second portion.

According to another embodiment, a vehicle seat assembly is provided with a seat bottom attached to a vehicle floor, a seat back connected to the seat bottom in an upright position and a head restraint attached to the seat back. The vehicle assembly is also provided with a trim panel. The trim panel is provided with a first leather portion laminated with a stabilization material, where the first portion has a thickness. The trim panel is provided with a second leather portion adjacent to the first leather portion without a laminated stabilization material. The second portion has thickness that is equal to the thickness of the first portion. The trim panel is attached to a central region of the seat back.

According to a further embodiment, the first portion of the trim panel is sewn to a lower central region of the seat back.

According to another embodiment, a trim member is provided with a leather trim panel with varying stitching patterns. One stitching pattern is an ornamental stitching pattern with a stabilization layer bonded to a region of the trim panel. Another, second stitching pattern is an ornamental stitching pattern with no stabilization layer. An area within the stitching of the first ornamental stitching pattern is greater than an area within the stitching of the second ornamental stitching pattern.

According to another embodiment, a leather trim panel having a minimum thickness at a cross section of a stitching pattern formed in the trim panel and a maximum thickness at a center of an area within the stitching pattern, wherein the maximum thickness remains constant and the area within the cross stitching varies.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
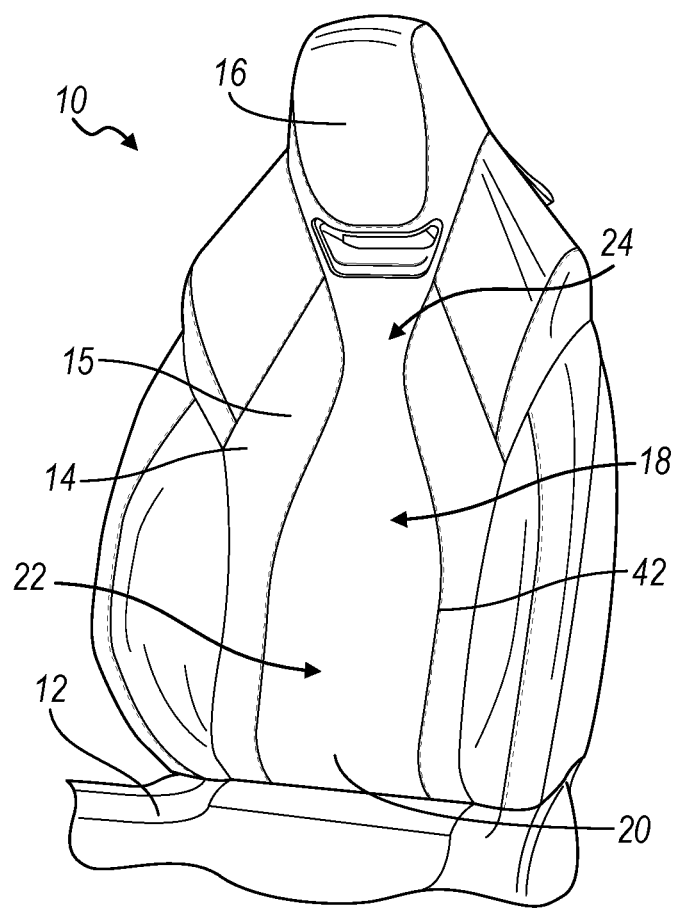
FIG. 1 illustrates a front perspective view of a vehicle seat assembly according to an embodiment.

FIG. 1 illustrates a vehicle seat assembly 10 according to an embodiment. The vehicle seat assembly 10 is provided with a seat bottom 12 adapted to be mounted to a vehicle floor. The vehicle seat assembly 10 may be provided in any row of a vehicle. The vehicle seat assembly 10 includes a seat back 14 extending upright from the seat bottom 12. The vehicle seat assembly 10 also includes a head restraint 16 extending above the seat back 14. The vehicle seat assembly 10 may be employed in any type of vehicle, including land vehicles, watercrafts, aircrafts, or the like. The seat assembly 10 may be any seat assembly, such as an office chair, furniture, or the like.

The seat assembly 10 is provided with a trim cover 15 over the seat back 14 to conceal a frame, cushioning, and functional components of the seat back 14. The trim cover 15 includes a leather trim panel 18 located in a central region of the seat back 14 of the vehicle seat assembly 10. While the trim panel 18 is located in a central region of the seat back 14 in this application, the trim panel 18 can be any trim panel on a vehicle seat assembly. The trim panel 18 is provided with a seam 42 that runs along the perimeter of the trim panel 18 to frame the trim panel 18. The seam 42 connects the trim panel 18 to the trim cover 15. The seam 42 also adds detailing to the vehicle seat 10. The trim panel 18 provides comfort and decorative appearance to the seat assembly 10.

Figure 2:
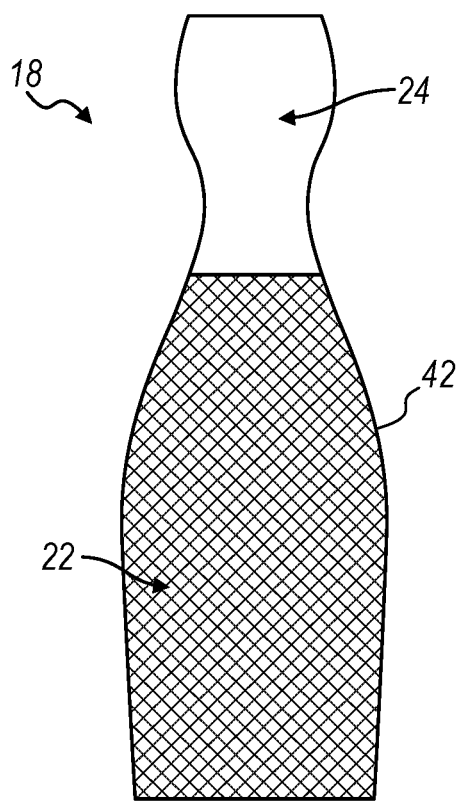
FIG. 2 illustrates a front elevation view of a trim panel of the vehicle seat assembly of FIG. 1, according to an embodiment.

FIG. 2 illustrates that the trim panel 18 includes two portions 22, 24. The trim panel 18 is provided with a first leather portion 22 and a second leather portion 24. The first portion 22 is sewn to a lower central region 20 of the seat back 14. The second portion 24 is sewn to an upper central region of the seat back 14. To create a decorative appearance and an even three-dimensional look to the trim panel 18, the trim panel 18 has an equal thickness from the first portion 22 to the second portion 24.

Figure 3:
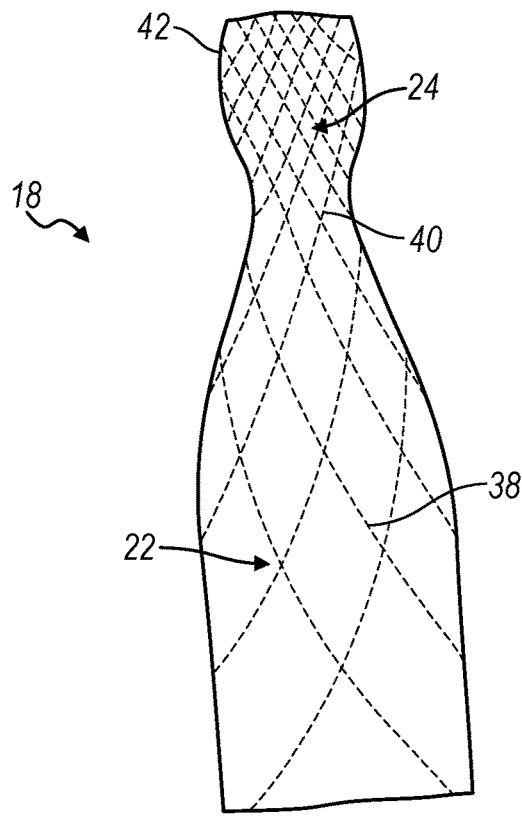
FIG. 3 illustrates a perspective view of the trim panel of FIG. 2.
Figure 4:
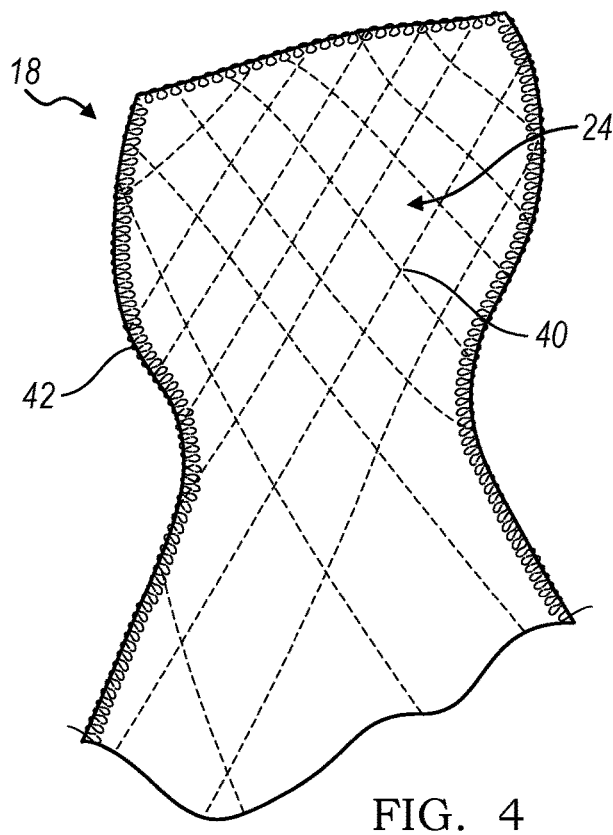
FIG. 4 illustrates an enlarged perspective view of an upper portion of the trim panel of FIG. 2.

FIGS. 3-4 illustrate the even three-dimensional appearance of the trim panel 18, as well as a cross-stitching pattern throughout the trim panel 18. Cross-stitching 38 is provided along a contact surface of the first portion 22 of the trim panel 18. Cross-stitching 40 is provided along a contact surface of the second portion 24 of the trim panel 18. Cross-stitching 38, 40 illustrates a rhomboid shape, however, the stitching 38, 40 can be done in other shapes and patterns.

The area within the cross-stitching 38 of the first portion 22 has an area. The area within the cross-stitching 40 of the second portion 24 has an area smaller than the area within the cross-stitching 38 of the first portion 22. Additionally, the area within the cross-stitching has a thickness that varies from the stitching to a peak at the center of the area within the cross-stitching in the second portion.

The cross-stitching 40 of the second portion 24 converges to a more concentrated pattern than the cross-stitching 38 of the first portion 22. Shown in FIG. 4, the pattern of cross-stitching 40 is most concentrated towards an upper portion of the second portion 24 of the trim panel 18. Along with the cross-stitching 40 becoming more concentrated, the seam 42 also becomes more concentrated towards the upper portion of the second portion 24 of the trim panel 18.

With laminated leather trim panels, the concentration of the stitching can flatten a thickness between the cross-stitching. In other words, as the stitching converges, the peaks are eliminated such that the layer has a consistent thickness, akin to the material thickness along the stitching. The concentration of stitching towards the upper portion of a laminated leather trim panel does not allow for the upper portion of the trim panel to hold equal thickness with the lower portion of the trim panel. Instead, the concentration of the stitching pulls on the upper portion of the trim panel, creating a smaller thickness compared to the rest of the trim panel. This creates a discontinuous look to the trim panel as a whole.

Figure 5:
FIG. 5 illustrates an exploded side elevation view of layers of a first portion of the trim panel of FIG. 2.
Figure 6:
FIG. 6 illustrates an exploded side elevation view of layers of a second portion of the trim panel of FIG. 2.

In order to maintain the trim panel 18 with an even thickness (with equivalent peaks) in the first portion 22 and the second portion 24, the layers of material used in each portion 22, 24 vary. The varied layers of material permit the concentrated stitching pattern 40 in the second portion. FIGS. 5-6 illustrate the layers of the first portion 22 and the second portion 24 of the trim panel 18.

FIG. 5 illustrates the layers of material of the first portion 22 of the trim panel 18. There may be four layers: a base layer 26, a foam layer 28, an adhesive layer 30, and a leather layer 31. According to an embodiment, the base layer 26 has a thickness of 1.2 millimeters; the adhesive layer 30 has a thickness of 0.5-1.0 millimeter; and the leather layer 31 has a thickness of 1.2 millimeters. The thickness of the combined layers 26, 28, 30, 31 is approximately twelve millimeters, except at the cross-stitching 38, wherein the thickness is less than twelve millimeters. The foam layer 28 is attached to the base layer 26. Then the first portion 22 of the trim panel 18 is laminated with the adhesive layer 30 to adhere to the foam layer 28. The adhesive layer 30 is thermally laminated to the first portion 22 and the foam layer 28 to bond the foam layer 28 to the first portion 22 of the trim panel 18. The adhesive layer 30 and the first portion 22 collectively provide a thickness and three-dimensional appearance to the trim panel 18.

FIG. 6 illustrates the layers of material of the second portion 24 of the trim panel 18. There may be four layers: a base layer 32, a foam layer 34, a leather layer 36, and a silicon layer 35. The foam layer 34 is attached to the base layer 32 of the second portion 24. Then the second portion 24 is provided with a leather layer 36 and a silicon layer 35 therebetween. There is no adhesive layer applied to the second portion 24 of the trim panel 18. This allows the second portion 24 to curve away from the foam layer 34 to remain in equal thickness to the first portion 22, to provide a three-dimensional appearance of the trim panel 18. Additionally, the second portion 24 of the trim panel 18 is not bonded to the foam layer 34. The silicon layer 35 is an optional layer added to the second portion 24 of the trim panel 18.

While various embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A trim panel comprising:
 a first leather portion laminated with a stabilization material, wherein the first portion has a thickness;
 a second leather portion adjacent to the first leather portion without a laminated stabilization material, wherein the second portion has a thickness that is equal to the thickness of the first portion;
 cross stitching along a contact surface of the first portion thereby reducing an overall thickness of the first leather portion and the stabilization material along the cross stitching; and
 cross stitching along a contact surface of the second portion.

2. The trim panel of claim 1, wherein the second portion is smaller than the first portion.

3. The trim panel of claim 1, further comprising a foam layer attached to a base of the first portion.

4. The trim panel of claim 3, wherein the first portion is laminated with an adhesive layer adhered to the foam layer.

5. The trim panel of claim 4, wherein the adhesive layer and the first portion of the trim panel collectively provide a thickness and three-dimensional appearance to the trim panel.

6. The trim panel of claim 5, wherein the adhesive layer is thermally laminated to the first portion and the foam layer.

7. The trim panel of claim 1, further comprising a foam layer attached to a base of the second portion.

8. The trim panel of claim 7, wherein the second portion is attached to the foam layer of the second portion.

9. The trim panel of claim 8, wherein no adhesive is applied to the second portion of the trim panel, allowing the second portion to remain in equal thickness to the first portion and to provide a three-dimensional appearance.

10. The trim panel of claim 8, wherein the second portion is not bonded to the foam layer.

11. The trim panel of claim 1, further comprising a silicon layer attached to the second portion of the trim panel.

12. The trim panel of claim 1, wherein the cross stitching of the second portion converges to a more concentrated pattern than the cross stitching of the first portion.

13. The trim panel of claim 12 wherein the second leather portion is without the laminated stabilization material so that the cross stitching does not flatten the overall thickness of the second leather portion.

14. The trim panel of claim 1, further comprising a seam along a perimeter of the first portion and the second portion.

15. The trim panel of claim 14, further comprising a foam layer attached to a base of the second portion, wherein the second portion has a thickness with a peak thickness within an area within the cross stitching in the second portion.

16. A vehicle seat assembly comprising:
a seat bottom attached to a vehicle floor;
a seat back connected to the seat bottom in an upright position;
a head restraint attached to the seat back; and
the trim panel of claim 1 attached to a central region of the seat back.

17. The vehicle seat assembly of claim 16, wherein the first portion of the trim panel is sewn to a lower central region of the seat back.

18. A trim member comprising:
a leather trim panel;
a first ornamental stitching pattern with a stabilization layer bonded to a region of the trim panel; and
a second ornamental stitching pattern with no stabilization layer; and
wherein an area within the stitching of the first ornamental stitching pattern is greater than an area within the stitching of the second ornamental stitching pattern such that the second ornamental stitching pattern does not flatten an overall thickness of the second leather portion due to the absence of the stabilization layer.

19. The trim member of claim 18 wherein the leather trim panel has a minimum thickness at a cross section of the second ornamental stitching pattern, and a maximum thickness at a center of an area within the first ornamental stitching pattern and at a center of an area within the second ornamental stitching pattern.

20. The trim panel of claim 19 wherein the second ornamental stitching pattern converges to a more concentrated pattern than the first ornamental stitching pattern.

* * * * *